United States Patent [19]

Fujimoto

[11] 4,135,198

[45] Jan. 16, 1979

[54] SHEET CLAMP APPARATUS

[75] Inventor: Sakae Fujimoto, Chofu, Japan

[73] Assignee: Ricoh Co., Ltd., Japan

[21] Appl. No.: 806,066

[22] Filed: Jun. 13, 1977

[30] Foreign Application Priority Data

| Sep. 18, 1976 | [JP] | Japan | 51/125904 |
| Jun. 28, 1976 | [JP] | Japan | 51/76231 |
| Jul. 27, 1976 | [JP] | Japan | 51/89299 |
| Jul. 27, 1976 | [JP] | Japan | 51/89300 |
| Jul. 30, 1976 | [JP] | Japan | 51/91458 |
| Aug. 3, 1976 | [JP] | Japan | 51/92469 |
| Aug. 3, 1976 | [JP] | Japan | 51/92470 |
| Sep. 10, 1976 | [JP] | Japan | 51/108631 |

[51] Int. Cl.² .................................................. G01D 15/28
[52] U.S. Cl. ........................................ 346/138; 101/415.1; 271/277; 346/68; 358/291
[58] Field of Search ............... 346/138, 68; 101/415.1; 271/277, 82, 3; 358/291

[56] References Cited

U.S. PATENT DOCUMENTS

| 2,372,774 | 4/1945 | Finch | 346/138 |
| 3,203,074 | 8/1965 | Monaghan | 346/138 X |
| 4,033,575 | 7/1977 | Fujimoto | 271/277 X |

Primary Examiner—Joseph W. Hartary
Attorney, Agent, or Firm—McGlew and Tuttle

[57] ABSTRACT

The sheet clamp apparatus is for clamping a sheet of original paper, recording paper, photosensitive paper, master plate, or the like on a drum usually provided in facsimile apparatus, copying apparatus, or the like. The apparatus comprises a single plate-shaped clamp member positioned along a generating line of the drum and at a part of the peripheral surface of the drum. The single clamp member presses firmly both the front edge and the rear edge of a sheet against the drum. The front edge of the sheet is clamped with the drum being stopped at a predetermined position, and the rear edge of the sheet is clamped after the drum has made about one revolution from the predetermined position of the front edge where the sheet is clamped.

10 Claims, 24 Drawing Figures

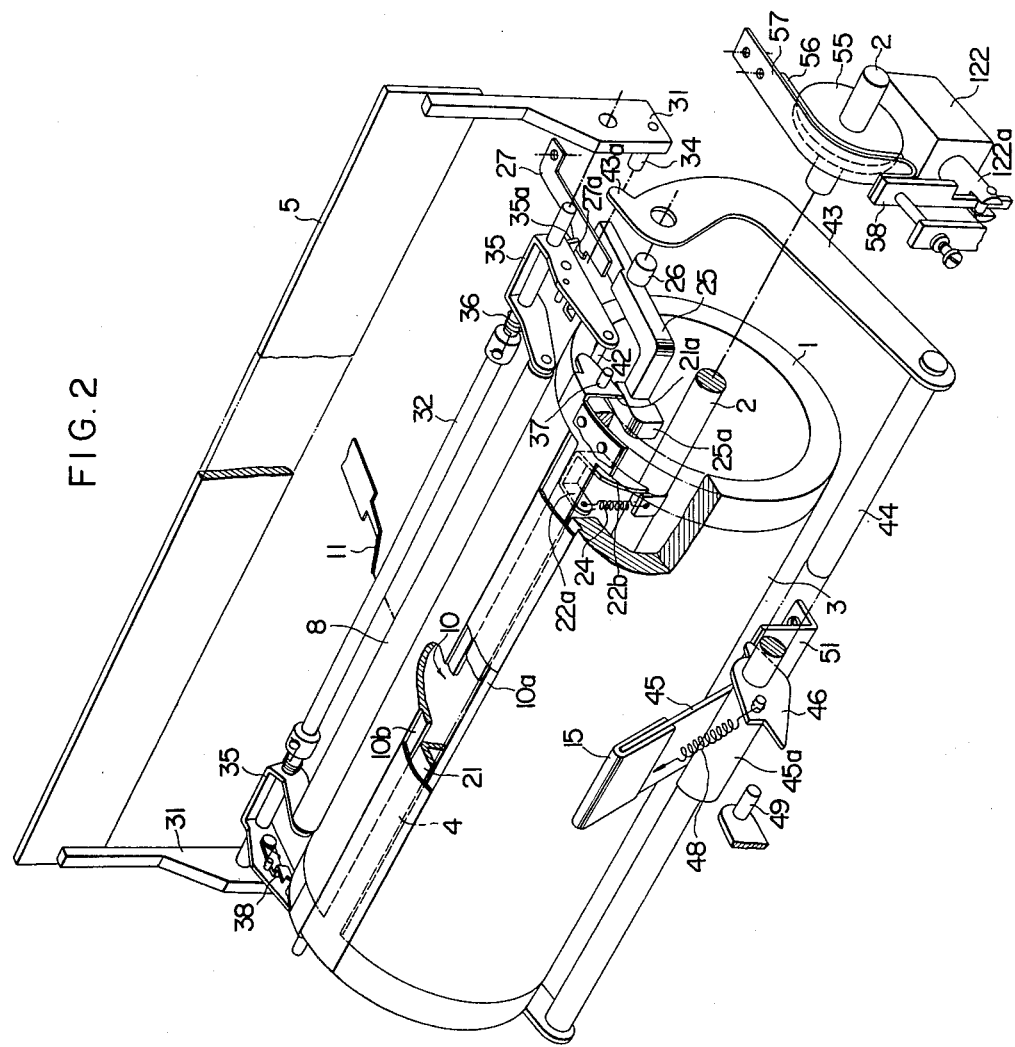

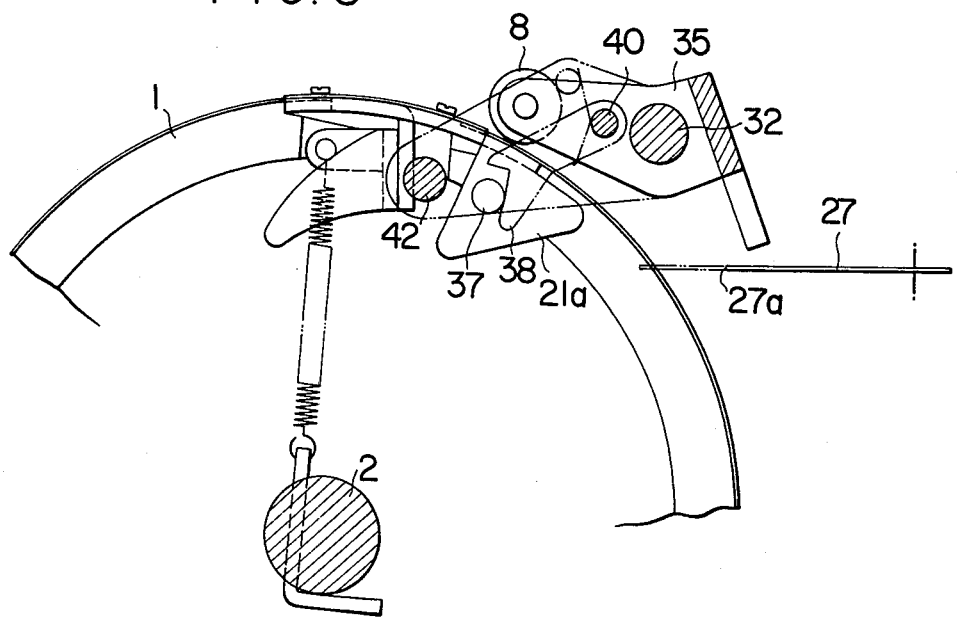
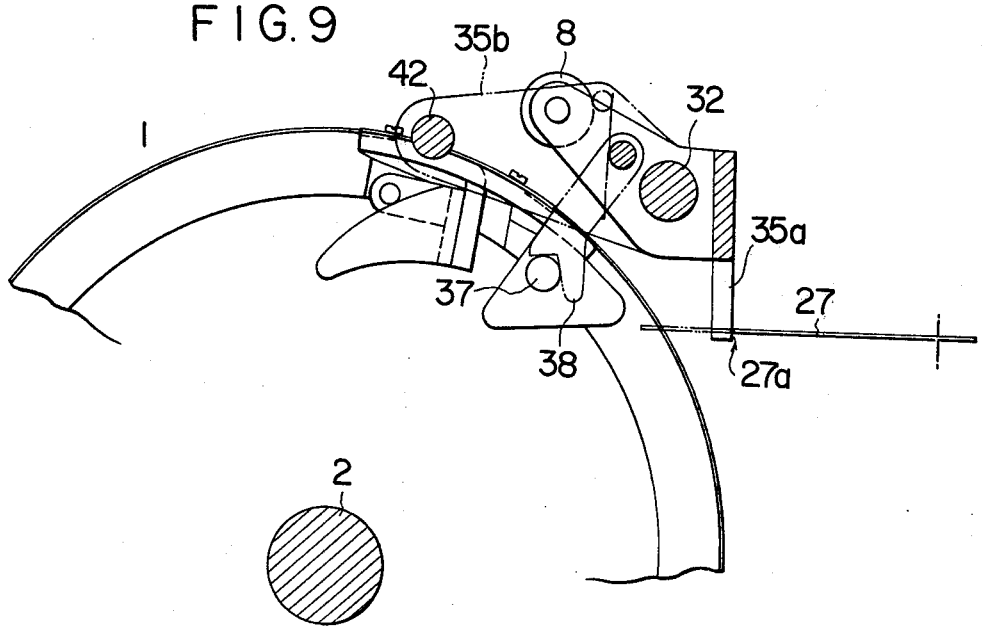

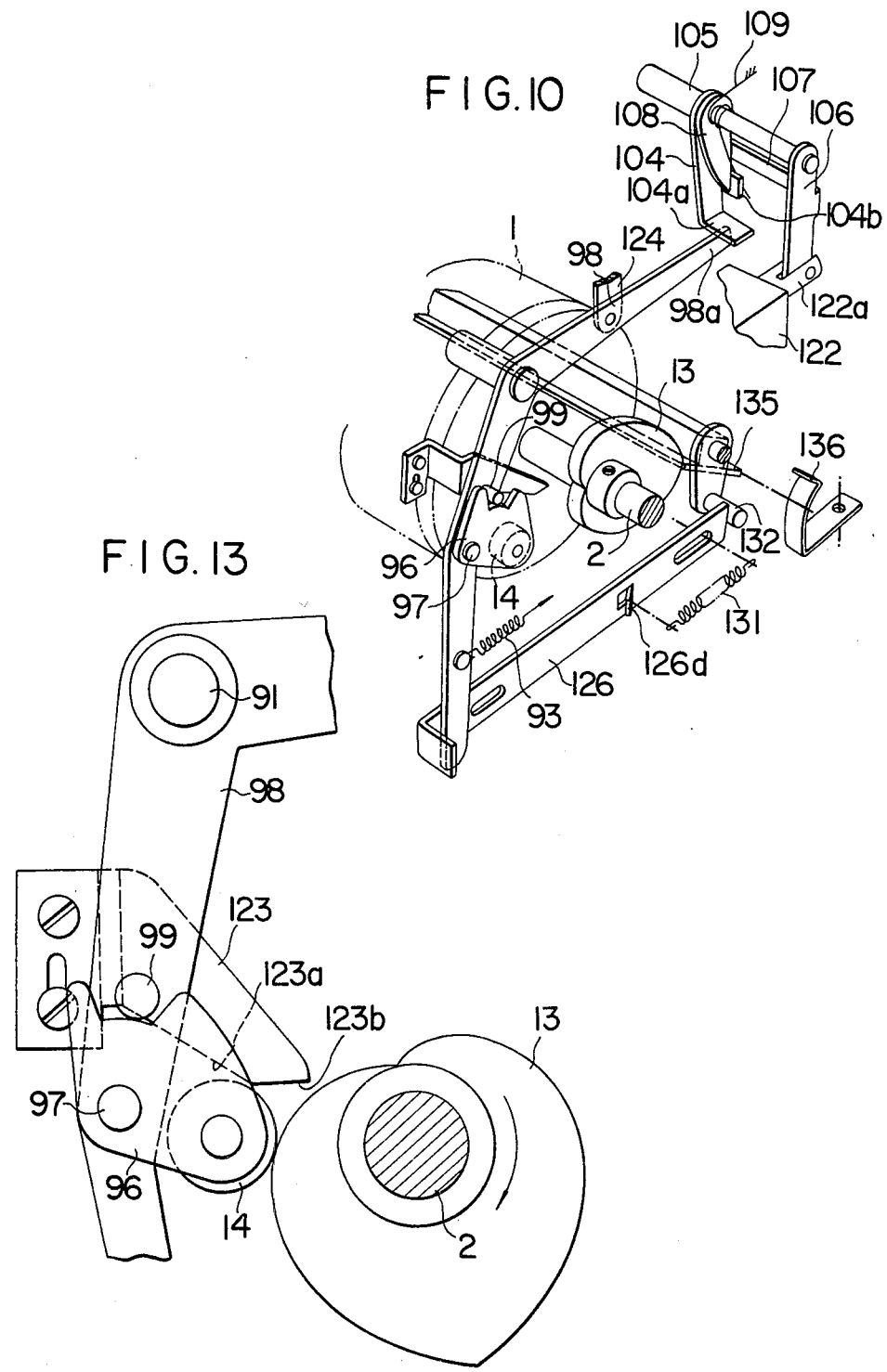

FIG.14
FIG.15
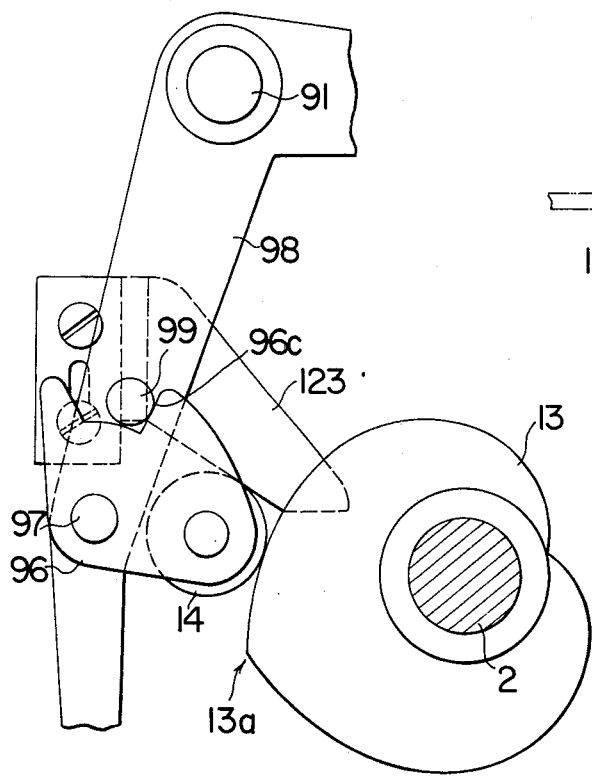
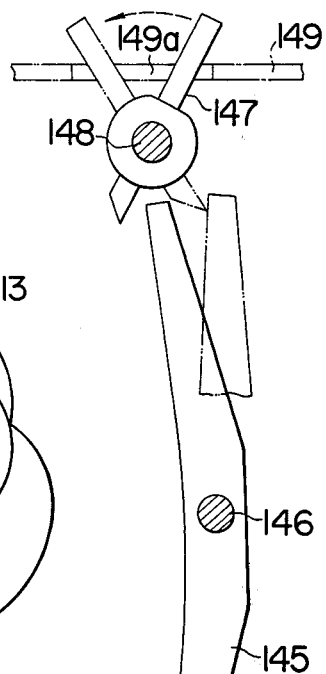
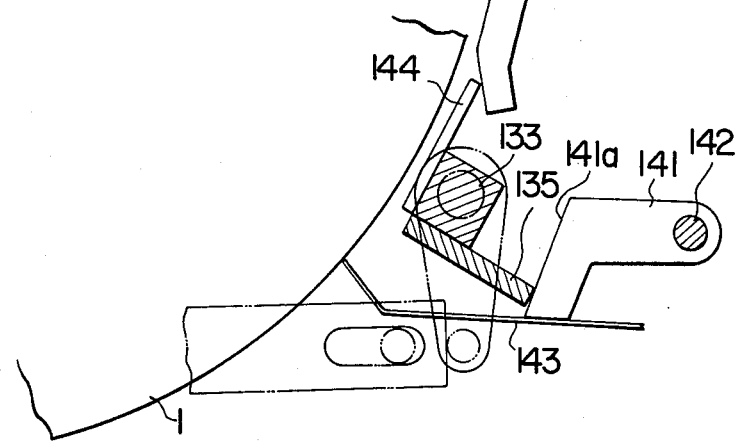

SHEET CLAMP APPARATUS

BACKGROUND OF THE INVENTION

The present invention relates to an apparatus for clamping a sheet round a drum usually provided in facsimile apparatus, copying apparatus, or printing apparatus, and more specifically to a clamp apparatus comprising a single clamp member positioned along a generating line of the drum and at part of the peripheral surface of the drum which clamps an original sheet for transmission, or a recording paper for reception in the case of facsimile apparatus, or a photoconductive sheet in the case of copying apparatus, or a master plate in the case of printing apparatus.

In the conventional clamp device of this sort, the front edge and the rear edge of a sheet to be wound round the drum are separately clamped by different clamp members positioned at the peripheral surface of the drum, that is, one clamp member for the front edge and the other for the rear edge of a sheet.

Thus, in order to clamp the front edge of a sheet on the drum, it is necessary to open and close one clamp member for the front edge and the other clamp member for the rear edge, respectively, with a proper timing. However, this results in inconvenience, for the clamp members become complicated in the operation mechanism.

SUMMARY OF THE INVENTION

In this invention, the front edge and the rear edge of a sheet are clamped on a drum by a single clamp member positioned at part of the peripheral surface of the drum and along a generating line of the drum. The front edge of the sheet is clamped on the drum, with the drum round which the sheet is to be wound being stopped at a predetermined position, and thereafter the rear edge of the sheet is clamped after the drum has made about one revolution from the position where the front edge of the sheet is clamped.

The front edge of the sheet is clamped by the rear portion of the clamp member, while the rear edge of the sheet is clamped by the front portion of the clamp member.

A principal object of the present invention is to provide a sheet clamp apparatus which is free from the conventional inconveniences, by clamping a sheet on the drum by a single clamp member.

It is another object of the invention to provide a stop means to stop the drum at a predetermined position so as to clamp the front edge of a sheet.

It is a further object of the invention to provide a clamp opening and closing mechanism to open the clamp member, in order to insert the front edge of a sheet, by opening the cover which is positioned above the upper portion of the drum.

It is a further object of the invention to provide a brake means to rotate the drum slower than the normal rotating speed of the drum when the drum is rotated about one revolution after the front edge of a sheet has been clamped.

It is a further object of the invention to provide a sheet-stroking device to press the rear edge of a sheet comparatively firmly against the peripheral surface of the drum before the rear edge of a sheet is clamped.

It is a further object of the invention to provide a sheet-detaching device to automatically drag the front edge of a sheet out of the clamp member by opening the cover, which is positioned over the upper portion of the drum, when the sheet that has been wound round the drum is detached from the drum.

It is a further object of the invention to provide a recording head releasing device for use with a facsimile apparatus.

Further objects of the invention will become apparent from the description of embodiments of the invention.

In accordance with the present invention, a sheet clamp apparatus can be obtained which is simpler in mechanism, more secure in sheet clamping performance, and easier in handling than the conventional sheet clamp apparatus.

BRIEF DESCRIPTION OF THE DRAWINGS

FIG. 2 to FIG. 9 illustrate one preferred embodiment of a sheet clamp apparatus according to the present invention;

FIG. 2 is a perspective illustration of the sheet clamp apparatus according to the present invention;

FIG. 3 is a schematic sectional side elevation of the sheet clamp apparatus at the time when a cover of the apparatus is closed and accordingly a sheet clamp member is closed, according to the present invention;

FIG. 4 is a schematic sectional side elevation of the sheet clamp apparatus at the time when the cover is opened and a sheet is being inserted into the opened rear portion of the sheet clamp member, according to the present invention;

FIG. 5 is a schematic sectional side elevation of the sheet clamp apparatus at the time when a drum has made about one fourth revolution after the clamping of the front edge of the sheet, according to the present invention;

FIG. 6 is a schematic sectional side elevation of the sheet clamp member and a stroking member for stroking the sheet on the drum, in particular when the stroking member comes near the end portion of the sheet, according to the present invention;

FIG. 7 is a schematic sectional elevation of the sheet clamp member and the stroking member when the front portion of the clamp member is opened and the rear edge of the sheet is being clamped, according to the invention;

FIG. 8 is a schematic sectional elevation of the sheet clamp member and the stroking member when the clamping of the rear edge of the sheet is finished, according to the invention;

FIG. 9 is a schematic sectional elevation of the sheet clamp member and the stroking member when the stroking member is held at a position retract from peripheral surface of the drum when the drum is rotated a little further in the condition shown in FIG. 8, according to the invention;

FIG. 10 to FIG. 14 illustrate one preferred embodiment of an apparatus for stopping a drum at a predetermined position according to the invention;

FIG. 10 is a perspective illustration of the apparatus for stopping a drum at a predetermined position, according to the invention;

FIG. 11 is a schematic sectional side elevation of the apparatus of FIG. 10;

FIG. 12 is a schematic sectional side elevation of the stopping apparatus of FIG. 10 when a roller is in pressure contact with the concave portion of a heart cam so that the drum is stopped at a predetermined position, according to the present invention;

FIG. 13 is a partial schematic sectional side elevation of the stopping apparatus of FIG. 10 when the heart cam is rotated a little from the predetermined stopping position, according to the invention;

FIG. 14 is a partial schematic sectional side elevation of the stopping apparatus of FIG. 10 at the rotating step subsequent to the step of FIG. 13;

FIG. 15 illustrates one embodiment of a manual retracting apparatus for retracting a recording stylus from the peripheral surface of the drum for use with a facsimile apparatus, according to the invention;

FIG. 16 is partial schematic sectional side elevation of an automatic retracting apparatus for retracting a recording stylus from the peripheral surface of the drum according to the invention, in which the recording stylus is in contact with the drum;

FIG. 17 is a partial schematic sectional side elevation of the automatic retracting apparatus of FIG. 16 in which the recording stylus is in a position away from the peripheral surface of the drum;

FIG. 18 is a schematic sectional side elevation of a brake means in which a brake shoe is not in contact with the peripheral surface of a brake wheel, according to the invention;

FIG. 19 is a schematic sectional side elevation of the brake means of FIG. 18 in which the brake shoe is in pressure contact with the peripheral surface of the brake wheel, according to the invention;

FIG. 21 is a schematic sectional side elevation of the sheet clamp apparatus which is opened so as for a sheet to be inserted into a sheet clamp member, according to the invention;

FIG. 22 is a schematic sectional side elevation of the sheet clamp member of FIG. 21 which is closed according to the invention;

FIG. 23 is a schematic sectional side elevation of the sheet clamp apparatus which is closed, according to the invention; and FIG. 24 is a schematic sectional side elevation of a sheet clamp member of FIG. 23, which is opened for paper insertion, according to the invention.

DETAILED DESCRIPTION OF PREFERRED EMBODIMENTS OF THE INVENTION

Figure 1:
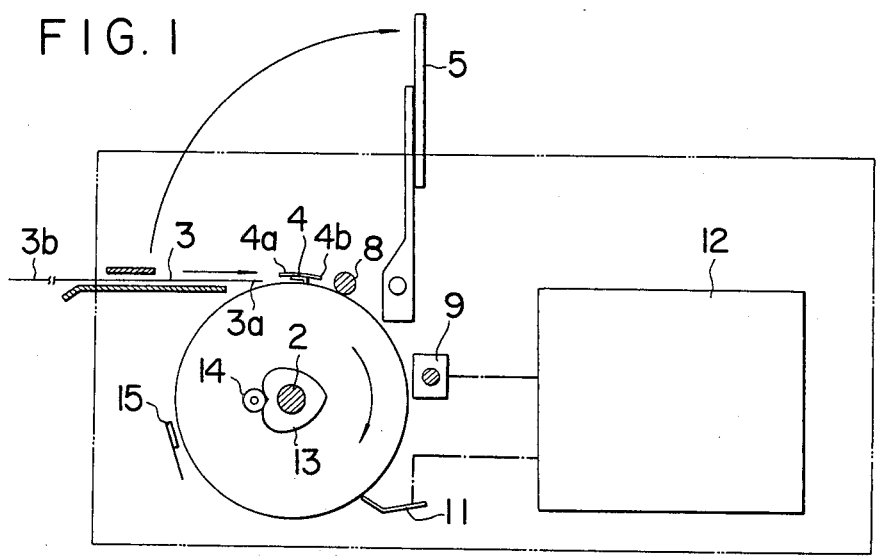
FIG. 1 is a schematic sectional side elevation of an embodiment of a sheet clamp apparatus according to the present invention for use with a facsimile apparatus.

FIG. 1 illustrates one embodiment of a sheet clamp apparatus for use with a facsimile apparatus according to the present invention. In FIG. 1, a drum 1, with an original sheet for transmission or a recording paper (hereinafter called "sheet") being wound thereon, is rotatably supported by a pair of immovable side plates (not shown) positioned at both sides of the drum through a shaft 2. The shaft 2 is fixed to the drum 1.

At part of the peripheral surface of the drum, there is attached a clamp member 4 for clamping a sheet 3 on the drum 1, which is movable in the radial direction of the drum 1. The clamp member 4 is almost as long as the drum 1 and is placed along a generating line of the drum 1 as described in detail later. The front edge 3a of the sheet 3 is pressed against the drum 1 by the rear portion 4a of the clamp member 4 and the rear edge 3b of the sheet 3 is pressed against the drum 1 by the front portion 4b of the clamp member 4 whereby the sheet 3 is clamped on the drum 1.

A stroking member 8, brought into pressure contact with the peripheral surface of the drum 1, strokes the sheet 3 when the sheet 3 is being wound around the drum 1. The attachment and detachment of the sheet 3 is performed, when the drum 1 is stopped, by opening a cover 5, which is positioned above the upper portion of the drum 1. With the cover 5 closed, the drum 1 is rotated in the direction of the arrow in FIG. 1. Thus, the sheet 3 is scanned by a scanning head 9 at the time of transmission or by a recording head 11 at the time of reception. The numeral 12 indicates a control apparatus for scanning signals.

A stopping mechanism to stop the drum 1 at a predetermined position is constituted by both a heart cam 13 fixed on the shaft 2 and a roller 14 which is in pressure contact with the heart cam 13.

A friction member 15 is provided to detach the sheet end from the drum at the time of paper discharge by pressure and sliding contact with the peripheral surface of the drum.

Figure 3:
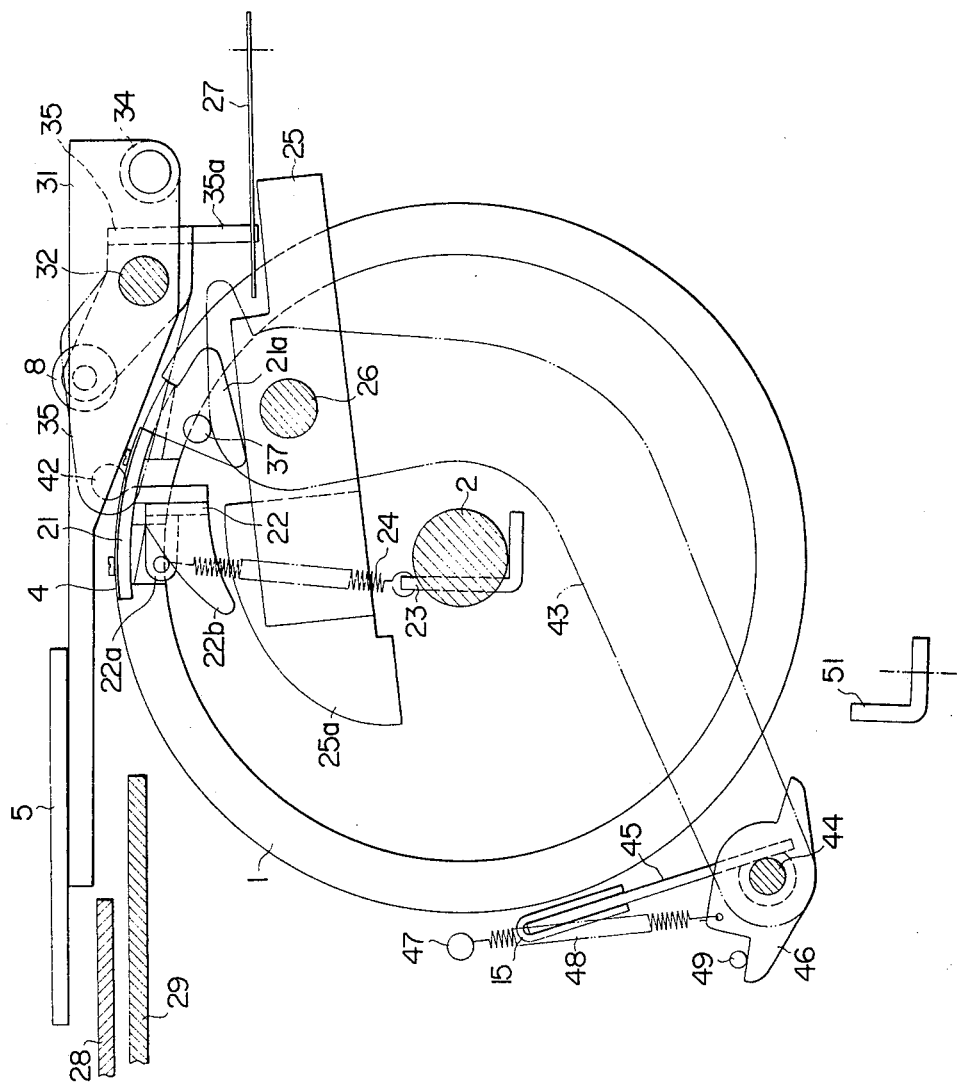

FIG. 2 to FIG. 9 illustrate one preferred embodiment of a sheet clamp apparatus according to the present invention. In FIG. 2 and FIG. 3, an angle support member 21 is placed in a long opening 10 formed along a generating line of the drum 1. The comparatively thin clamp member 4 fixed on the support member 21 is in pressure contact with the stepped cut portions 10a, 10b formed along the edges of the long opening 10. On the depending leg of the support member 21, a two-arm member 22 is fixed as shown in FIG. 3. One arm 22a of the two-arm member 22 and a fixture 23 are connected by a tightly stretched spring 24 at the respective ends thereof, whereby the clamp member 4 is brought into pressure contact with the peripheral surface of the drum 1. A follow-up member 25, having a cam 25a at the free end thereof, is pivotally mounted on the side plate (not shown) through a pivot 26, and a plate spring 27 is in pressure contact with the upper right end of the follow-up member 25.

Guide plates 28, 29 in FIG. 3 form a sheet inlet. A pair of support plates 31, to which the cover 5 is fixed is pivotally mounted on both side plates through a shaft 32. A shaft 34, fixed on the pair of support plates 31, is in a position so as to be able to press the upper surface of a plate spring 27 when the cover 5 is opened. On the shaft 32 is pivotally mounted a pair of support members 35, and at the arm ends of the support members 35, the stroking member 8 is rotatably mounted. To the stroke member 8 is given a rotating bias in the direction of being in pressure contact with the peripheral surface of the drum by the elasticity of a pair of torsion springs 36.

Figure 7:
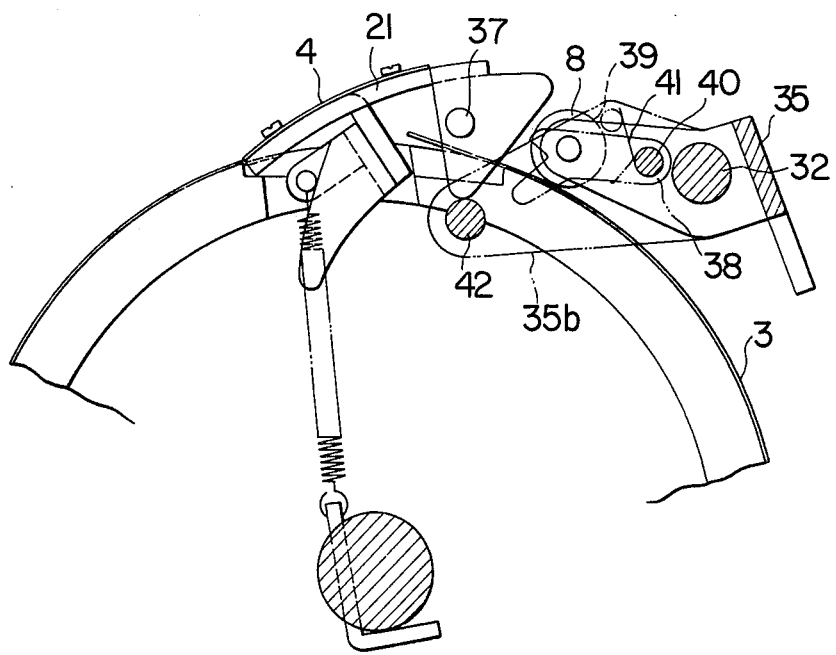

Both ends of the support member 21 are slightly extended in the peripheral direction of the drum 1 and are buried in the stepped cut portions 10a, 10b. A pin 37 is fixed at the bent piece 21a formed at the outside of the angle support member 21. On the arms 35a of the support members 35, the base portion of a stopper member 38 is pivotally mounted through a shaft 40 as shown in FIG. 7. The stopper member 38 is brought into pressure contact with a stopper 39 by the elasticity of a torsion spring 41 attached to both member stopper 39 fixed on the support member 35 and the stopper member 38. The pin 37 releases the stroking member 8 in collaboration with the stop member 38 as explained hereafter. A pin 42 attached to the free ends of the support members 35 has the function of increasing the stroking action in collaboration with the lower edge of the bent piece 21a.

On the pivot 26 of each follow-up member 25, a support member 43 is pivotally mounted. On a shaft 44 fixed to the support members 43 is pivotally mounted a base portion 45a of a paper detaching lever 45 with the friction member 15 fixed at the free end thereof. By the elasticity of a tightly stretched spring 48, one end of the spring being connected with a stopper plate 46 fixed at one side of the base portion 43a and the other end with an immovable pin 47, a clockwise rotation bias is given to the paper detaching lever 45, and by bringing the upper end portion of the stopper plate 46 into pressure contact with a stopper 49, the friction member 15 is usually positioned apart from the peripheral surface of the drum 1.

Figure 4:
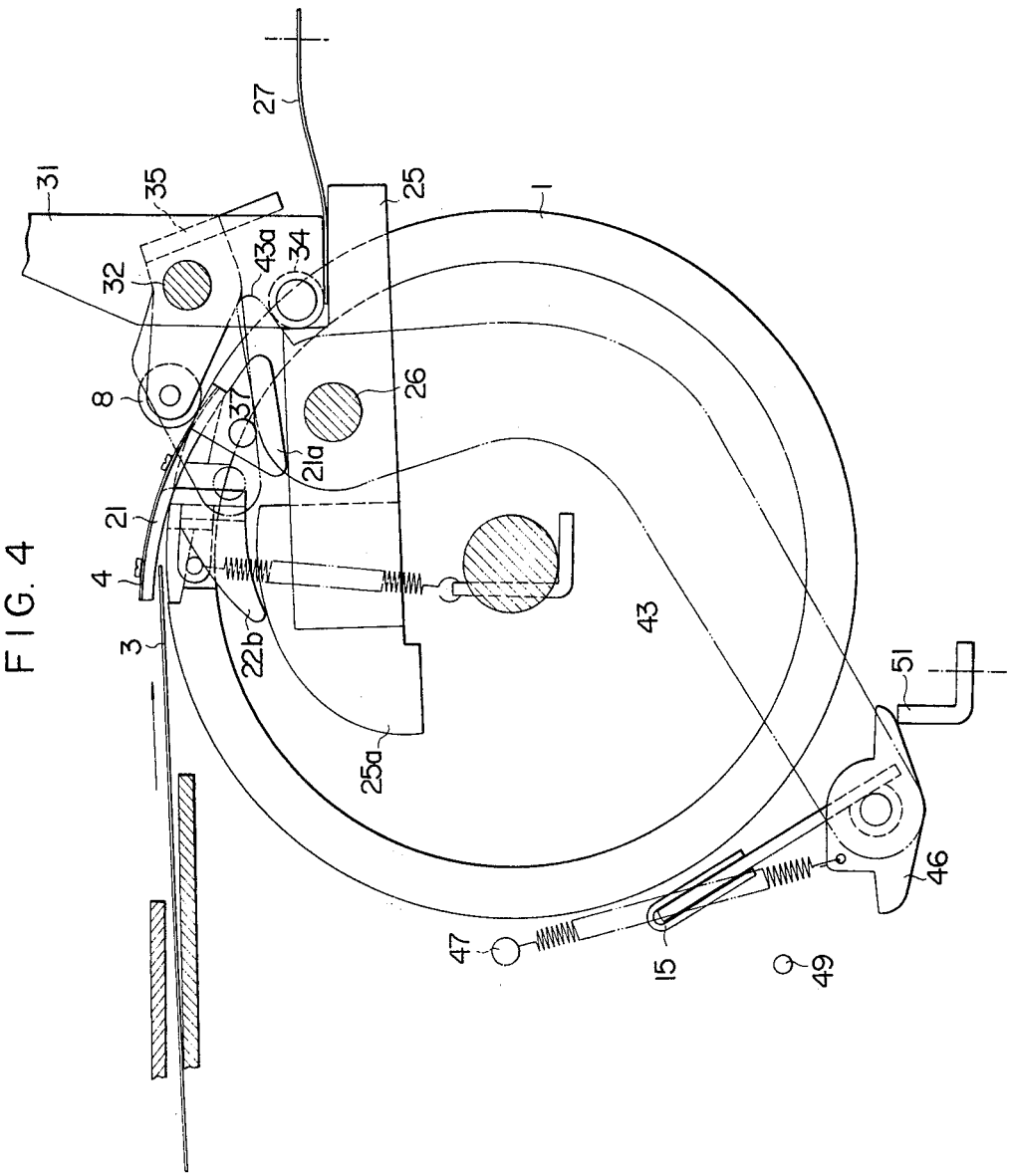

The drum 1 is held at a position as shown in FIG. 3 by a stopping mechanism hereinafter described. When the cover 5 is opened in this condition, as shown in FIG. 4, the shaft 34 presses the follow-up member 25 through the plate spring 27 and thus the follow-up member 25 is turned clockwise. As a result, the other arm 22b of the two-arm member 22 is lifted up by the edge of the cam 25a so that the angle support member 21 is turned clockwise as viewed from the right end thereof, and thus one edge portion of the clamp member 4 is opened. The shaft 34 pushes a short arm 43a of each support member 43, resulting in turning the support members 43 counterclockwise. At this time, the stopper plate 46 is disengaged from stopper 49. Thus, the friction member 15 slides along the peripheral surface of the drum in pressure contact with the drum. Therefore, when the sheet 3 has already been clamped on the peripheral surface of the drum, the friction member 15 acts so as to pull the end portion of the sheet from the lower portion of the clamp member 4. In the meantime, the lower edge portion of the stopper plate 46 strikes on a stopper member 51 fixed at an immovable member as shown in FIG. 4 and the stopper plate 46 is whereby turned counterclockwise and consequently the friction member 15 is again set apart from the peripheral surface of the drum 1.

Paper feed to the drum 1 is performed by inserting the front edge of the sheet 3 into the inside of the clamp member 4 as shown in FIG. 4.

Turning now to FIG. 3, the support members 35 of the stroking member 8 are prevented from turning by a leg portion 35a thereof being in pressure contact with a step portion 27a of the plate spring 27 (refer to FIG. 2). Thus, the stroking member 8 is held at a position retracted from the peripheral surface of the drum.

When the cover 5 is opened, the shaft 34 pushes the plate spring 27 downwards. As a result, the leg 35a is disengaged from the step portion 27a of the plate spring 27 and the support members 35 are turned counterclockwise so that the stroking member 8 is brought into pressure contact with the peripheral surface of the drum.

Figure 5:
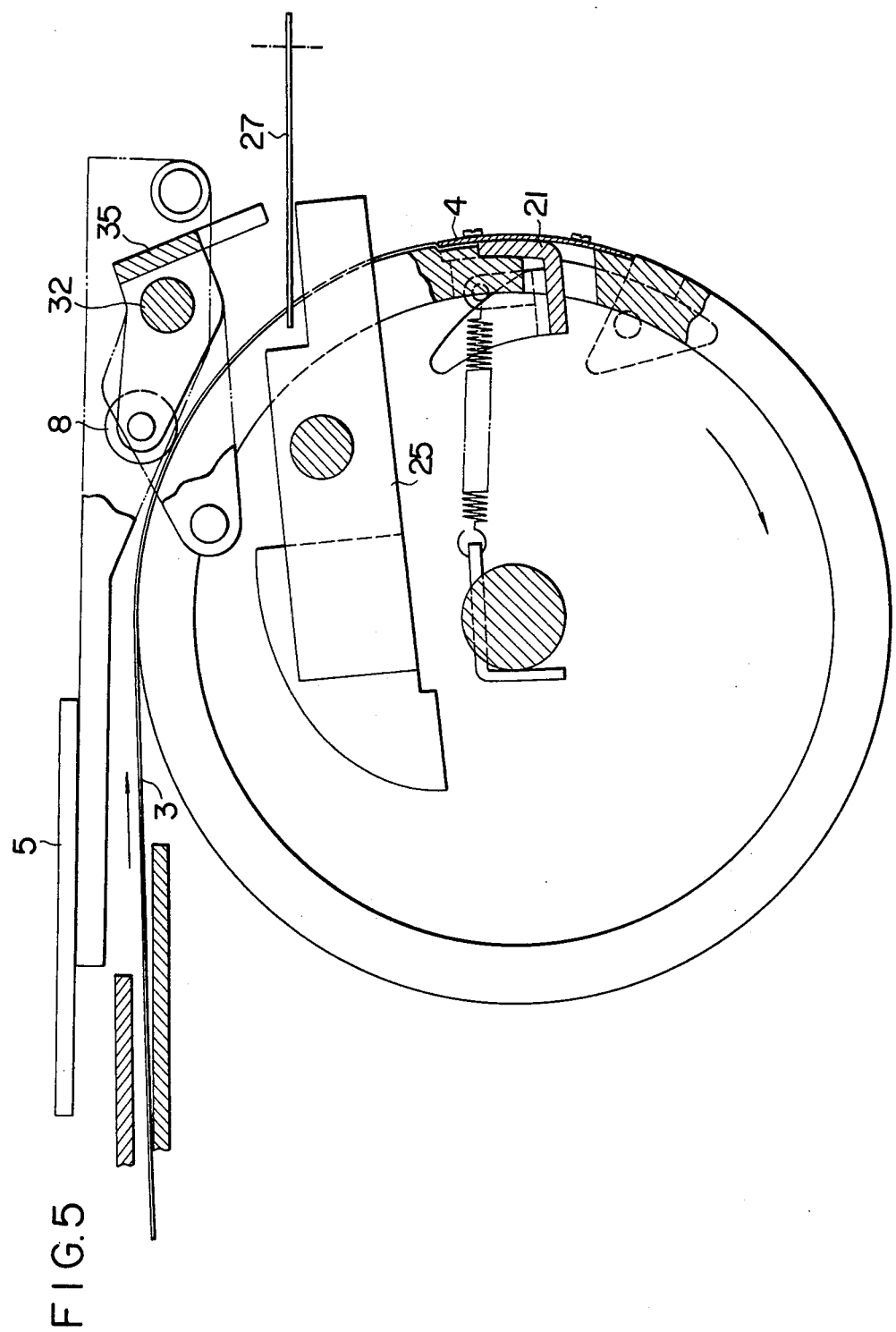
Figure 6:
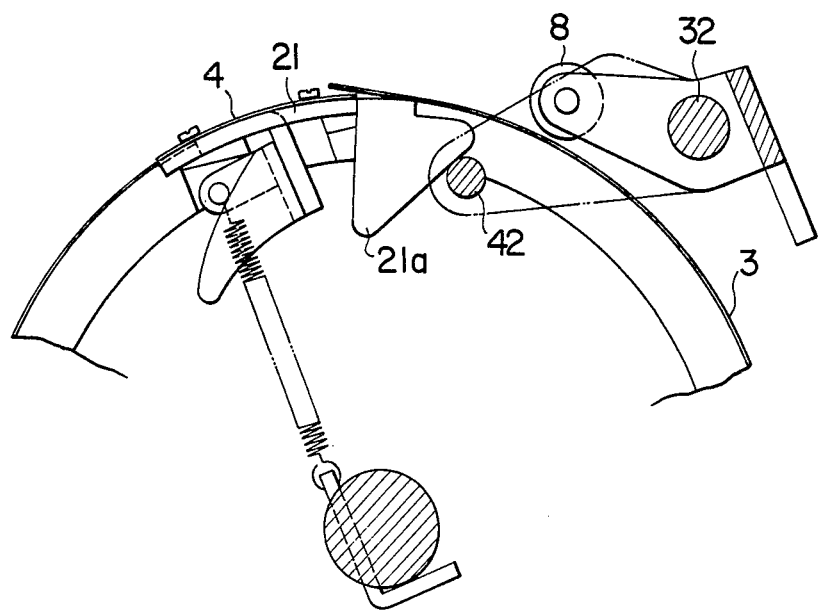

When the cover 5 is closed in this condition, the follow-up members 25 and the suport member 43 are returned to the rotating condition and the front edge of the sheet 3 is clamped by the closure of one side edge of the clamp member 4, and at the same time, the friction member 15 is held at its original position as shown in FIG. 3. Subsequently, a start button (not shown) is pushed and the drum 1 is rotated. The sheet 3 is wound closely around the drum as shown in FIG. 5 while the sheet is being stroked. When the stroking member 8 is in a position of being in pressure contact with the peripheral surface of the drum, the pin 42 is in the path of rotation of the bent piece 21a of the support member 21. When the drum 1 is rotated above one revolution, the lower edge of the bent piece 21a runs on the pin 42 as shown in FIG. 6, and the support member 21 is turned counterclockwise about the left edge thereof as shown in FIG. 7 whereby the edge portion of the clamp member 4 at the rear side of the sheet is opened. When the end portion of the sheet 3 is pushed by the clamp member 4, there is the inconvenience of causing the looseness of sheet winding around the peripheral surface of the drum by the looseness of the sheet 3 between the stroking member 8 and the clamp member 4. However, as shown in FIG. 6, as the bent piece 21a runs on the pin 42 and pushes the pin 42 downwards, the stroking effect of the stroking member 8 is further enhanced when the stroking member 8 comes near the end portion of the sheet. Thus, the above-memtioned inconvenience is obviated.

The clamp member 4 is closed by the bent piece 21a being detached from the pin 42 after having run on the pin 42 as shown in FIG. 8. When the drum is rotated a little further in this condition, the pin 37 of the bent piece 21a is brought into pressure contact with the free end of the stopper member 38 as shown in FIG. 8 and rotates the stopper member 38 counterclockwise, and when the drum is rotated further and the bent piece 21a engages in the notch of the stopper member 38, the stopper member 38 lifts up the support member 35 and rotates the support 35 clockwise as shown in FIG. 9. As a result, the leg portion 35a is again engaged in the step portion 27a of the plate spring 27 as shown in FIG. 9 and the support member 35 is held at the original position, and at the same time, the stroking member 8 is held at a position retracted from the peripheral surface of the drum. When the pin 37 is moved further from the position shown in FIG. 9, it is disengaged from the notch of the stopper member 38, and the stopper member 38 is returned to the original position shown in FIG. 7 by the bias of the spring 41.

Figure 11:
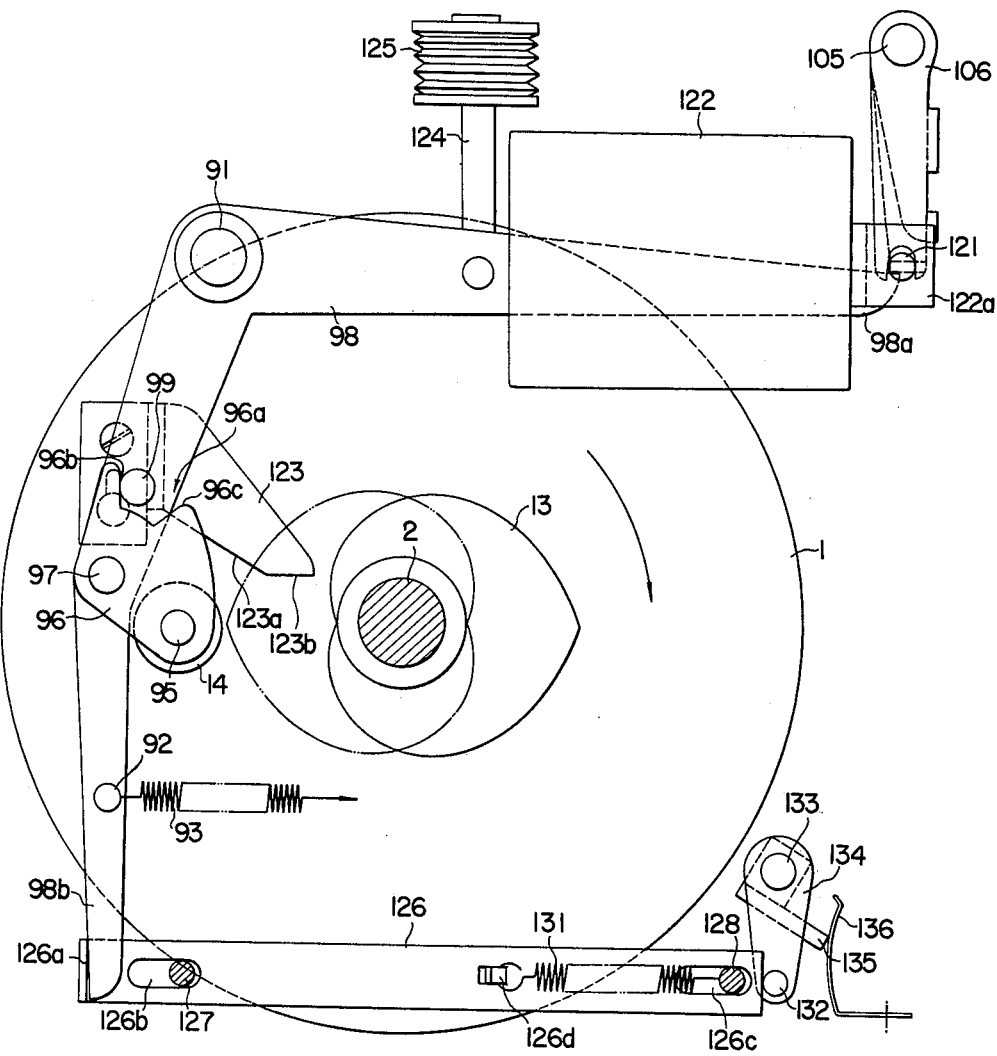

FIG. 10 to FIG. 14 illustrate one preferred embodiment of an apparatus for stopping a drum at a predetermined position according to the present invention. In FIGS. 10 and 11, the shaft 2 which supports the drum 1 is pivotally mounted in a pair of side plates (not shown), and at one end of the main shaft is fixed the heart cam 13. The roller 14, positioned disengaged from the peripheral surface of the heart cam 13, is pivotally mounted on a support plate 96 through a pivot 95. On an operation lever 98, having the support member 96 pivotally mounted on it through a pivot 97, a pin 99 is fixed. The pin 99 is projected within the cutaway portion 96a formed at the peripheral edge of the support member 96 so that the movable range of the pin 99 is restricted. When the stop apparatus is not set in operation, the roller 14 is outside the path of rotation of the heart cam 13 and one side edge 96b of the cutaway portion 96a is in pressure contact with the pin 99 due to the gravity of the roller 14.

The operation lever 98 is pivotally mounted on the side plate through a pivot 91 and is given a counterclockwise rotating bias, as shown in FIG. 11, by the elasticity of a tightly stretched spring 93, its one end being connected with an immovable member and the other end being connected with a pin 92 of the lever 98. By bringing the right end portion 98a of the lever 98 into pressure contact with the backside of the stopper piece 104a at the free end of the stopper member 104, the rotation of the operation lever 98 is hindered. The stopper member 104 is pivotally mounted on a pivot 105 which is fixed on an immovable member, and is connected with an operation lever 106, which is pivotally mounted at the end of the pivot 105, through a plate 107. Thus, the stopper member 104 and the operation lever 106 are substantially in one integral body. A lever 108, pivotally mounted on the pivot 105, is given a clockwise rotating bias by the elasticity of a reset spring 109 in FIG. 10. The lower end portion of the operation lever 106 is connected with an operation rod 122a of a solenoid 122 through a pivot 121. The slanting edge 123a of a guide plate 123, whose base is fixed on the side plate are positioned so as to be capable of engaging roller 14 at the time when the roller 14 swings. The upper portion of a connecting rod 124, of which other end is connected with the operation lever 98, is connected with one end of an air damper 125.

Figure 12:
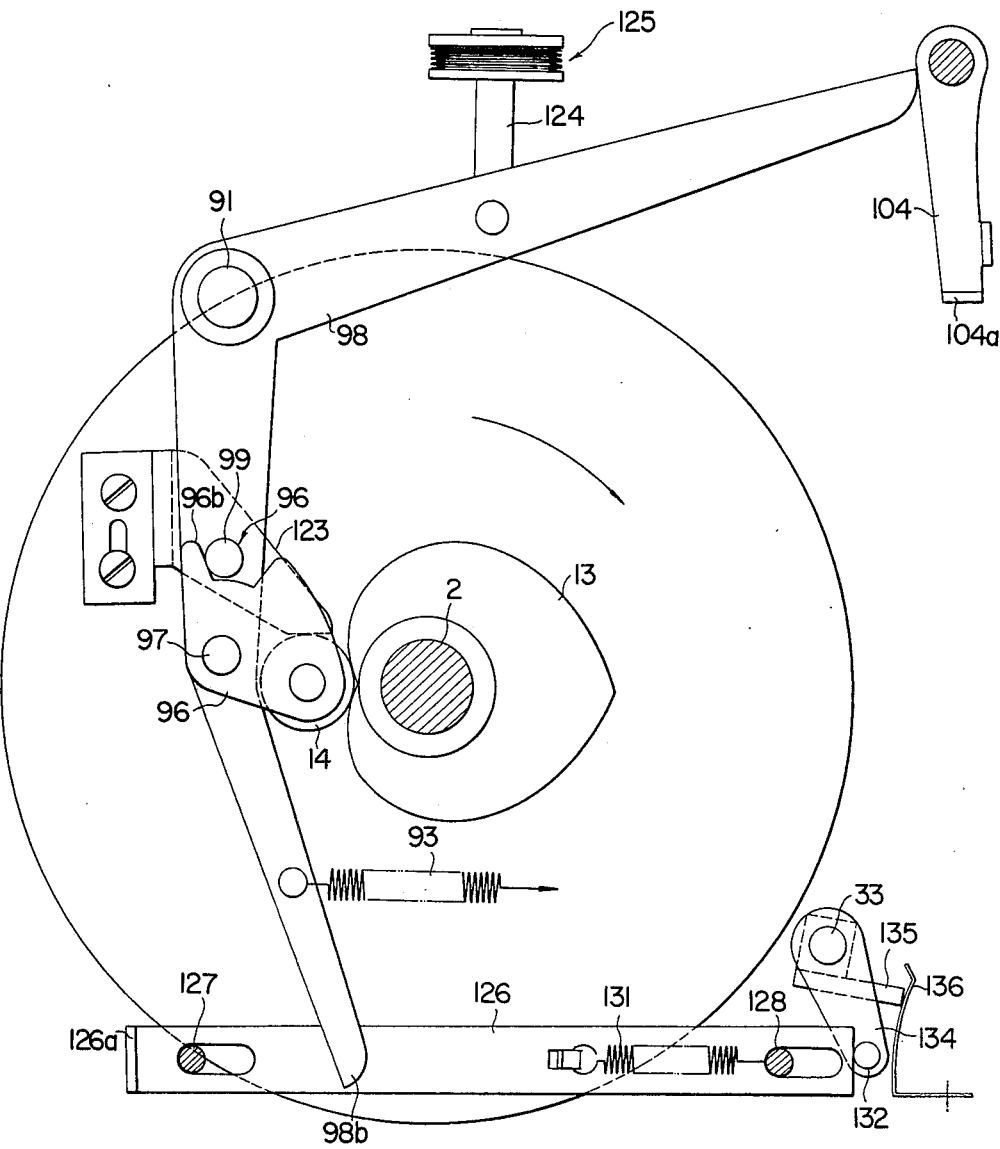

When a power source for the drum 1 is disconnected, the solenoid 122 is actuated so that the operation rod 122a is extended and the stopper member 104 is turned counterclockwise. The operation lever 98, released from the stopper member 104, is turned counterclockwise by the elasticity of the spring 93 and brings the roller 14 into pressure contact with the peripheral surface of the heart cam 13 as shown in FIG. 12. With the roller 14 engaging in the concave portion of the heart cam 13, the roller 14 is in pressure contact with the lower side edge 123b of the guide plate 123 whereby the heart cam 13 and the drum 1, being in one integral body, are held in a predetermined position.

When the heart cam 13 and the drum 1 begin to be rotated from the predetermined position shown in FIG. 12, since the driving force by the small diameter portion of the heart cam 13 is comparatively great, the operation lever 98 is easily driven clockwise against the elasticity of the spring 93. In other words, the roller 14 makes a parallel movement along the lower side edge 123b of the guide plate 123. In this condition, there is no relative movement between the support member 96 and the operation lever 98, and the cutaway side edge 96b of the support member 96 remains in pressure contact with the pin 99. Subsequently, as the roller 14 is moved upwards along the slanting side edge 123a of the guide plate 123, the support member 96 is rotated counterclockwise, viewed from the operation lever 98. As the roller 14 is rotated counterclockwise by the friction between the roller 14 and the heart cam 13, at first the roller 14 is moved along both the slanting side edge 123a and the lower edge 123b. This toggle effect is finished at the time when the pin 99 strikes the other side edge 96c of the cutaway portion 96 (refer to FIG. 14) and thereafter the support plate 96 and the operation lever 98 are turned clockwise as if they were substantially in one integral body. The right end portion 98a of the operation lever 98 is brought in pressure contact with the backside of the stopper piece 104a, whereby the operation lever 98 is retained at the original position shown in FIG. 11.

In FIG. 14, when the apex 13a of the heart cam 13 has passed through the pressure contact portion with the roller 14, the support plate 96 is rotated clockwise within the range of the cutaway portion 96a under the effect of the weight of the support plate and remains in a position shown in FIG. 11. Namely, as the roller 14 is rotated in the direction of moving away from the path of rotation of the apex 13a of the heart cam 13, the collision between the roller 14 and the apex 13a, and the breakdown noises or the like caused by such collision, are obviated.

In FIG. 11, a bent piece 126a of sliding member 126 is in pressure contact with the lower end portion 98b of the operation lever 98. The sliding member 126 is held by the pins 127 and 128 which are fixed on and immovable member and fitted in the slots 126b and 126c of the sliding member 126. Further, the sliding member 126 is given a right-hand moving bias by the elasticity of a taut spring 131, one end of the spring being connected with the pin 128 and the other end thereof being connected with a hook 126d of the sliding member 126. A pin 132, which is fixed on the free end of an arm member 134, is in pressure contact with the right end of the sliding member 126. The arm member 134 is fixed at one end of a pivot 133 pivotally mounted on an immovable member. At one side of a square portion of pivot 133, a plate 135 is fixed. A plate spring 136, which is fixed on an immovable member, is in pressure contact with a free end of the plate 135.

In FIG. 15, the plate 135 is formed to extend in parallel with the drum 1 and the free end of the plate faces the side edge portion 141a of the support lever 141. The base portion of the support lever 141 is pivotally mounted on an immovable member through a pivot 142. At the free end of the support lever 141, a recording stylus 143 is fixed. On the other side of the square portion of the axis 133, plate 144 is fixed. A lever 145, which is disengable from the plate 144, is pivotally mounted on an immovable member through a pivot 146. A switch-over member 147, which rotates the lever 145, is pivotally mounted on an immovable member through a pivot 148. The upper portion of the switch-over member projects from a slot 149a formed on a cover 149.

Figure 16:
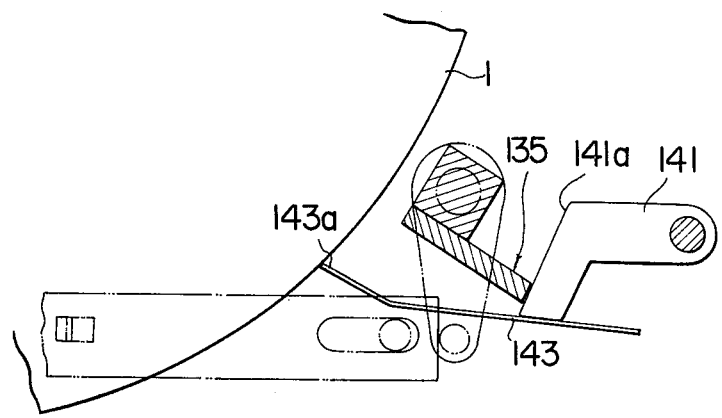
FIG. 16 and FIG. 17 illustrate another embodiment of an apparatus for having a recording stylus automatically be retracted from the peripheral surface of the drum when the drum is stopped, according to the invention.
Figure 17:
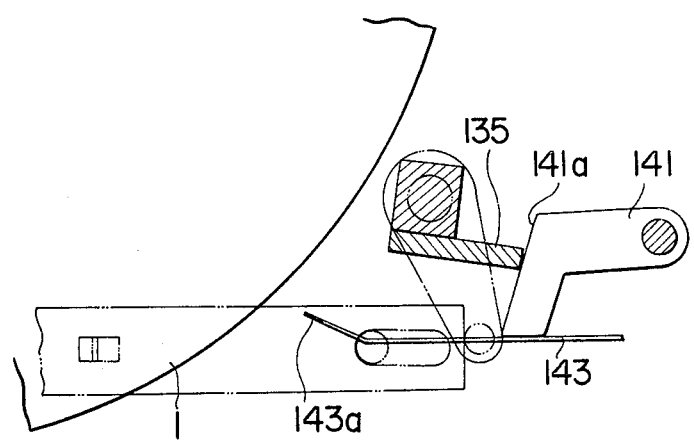

In FIG. 11, a driving force having been disconnected for the drum 1 rotating in the direction of the arrow, when the cover 5 (refer to FIG. 1) is opened, the solenoid 122 is activated and the operation rod 122a is extended, rotating a two-arm member 106 and a stopper member 108 counterclockwise and releasing the operation lever 98. As a result, the operation lever 98 is turned counterclockwise and the roller 14 is brought into pressure contact with the peripheral surface of the heart cam 13 and then engages in the concave portion of the heart cam 13. Thus, the heart cam 13 and the drum 1 are stopped at a predetermined position. In the meantime, the sliding member 126, which has been stopped by the operation lever 98, is moved to the right by the elasticity of the spring 131, and by the right end portion of the sliding member 126, the arm member 134 and the plate 135, which is substantially integral to the arm member 134, are rotated counterclockwise as shown in FIG. 12. In other words, by rotating the plate 135 from the position shown in FIG. 16 to the position shown in FIG. 17, the side edge 141a of the support lever 141 is pressed by the free end of the plate 135 and consequently the support lever 141 is rotated counterclockwise. Therefore, the free end 143a of the recording stylus 143 attached on the support lever 141 is caused to retract from the position of being capable of recording, shown in FIG. 16, to the position away from the peripheral surface of the drum, as shown in FIG. 17. Immediately before the drum 1 is stopped at a predetermined position, namely when the roller 14 is stopped, engaged in the concave portion of the heart cam 13, the drum 1 may be rotated reversely, say, in the direction opposite the arrow.

However, as mentioned above, since the recording stylus 143 is caused to retract automatically at the same time when the stop mechanism is actuated, such inconvenience as the free end 143a of the recording stylus being bent by the peripheral surface of the drum 1 is obviated. The manual retracting of the recording stylus 143 from the peripheral surface of the drum is performed by rotating the changeover lever 147 to the position shown by the chain line, thus turning the lever 145 clockwise and the plates 144 and 135 counterclockwise, respectively in FIG. 15.

Thus, damage to the recording stylus and recording sheet, which may be caused at the time of the reverse rotation of the drum, is prevented by having the recording stylus be retracted from the peripheral surface of the drum by the linkage of the mechanism for stopping the drum at a predetermined position.

Figure 18:
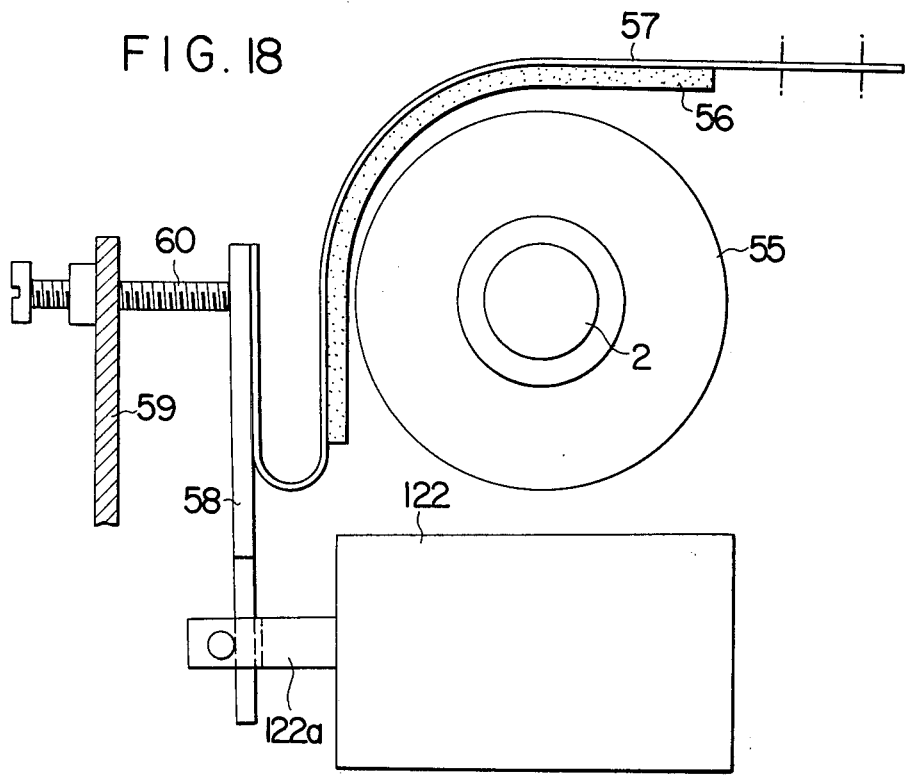
FIG. 18 and FIG. 19 illustrate one preferred embodiment of a brake means according to the invention.
Figure 19:
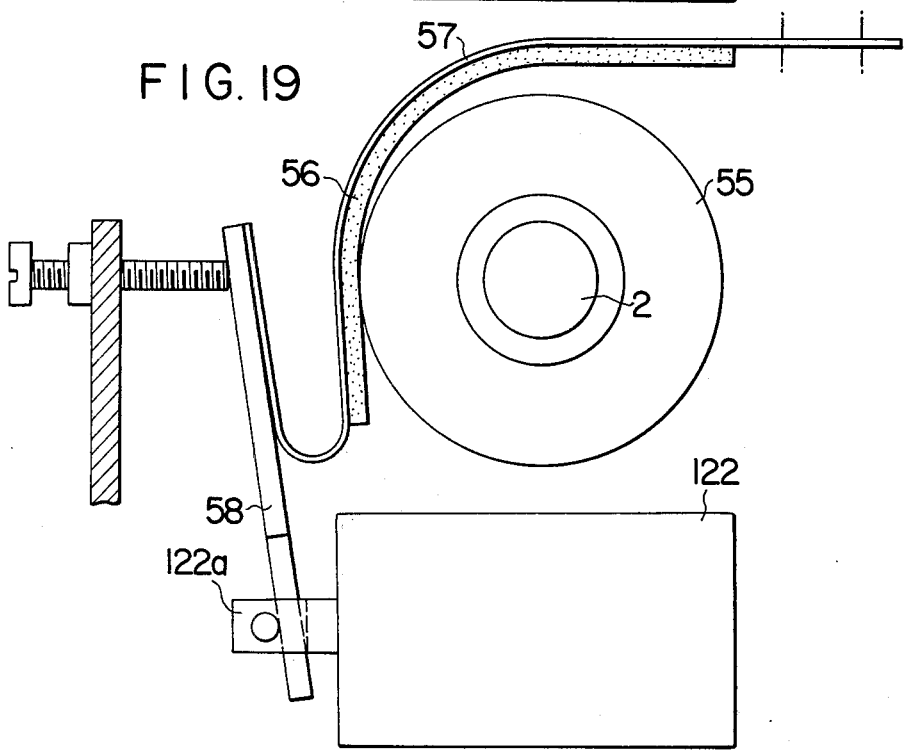

FIGS. 18 and 19 illustrate one preferred embodiment of a brake means according to the present invention. In these figures, at one end of the main shaft 2 of the drum 1 is fixed a brake wheel 55. A brake shoe 56, which is capable of coming in contact with the peripheral surface of the brake wheel, is fixed on an elastic brake plate 57. One end of the brake plate 57 is fixed on an immovable member and the other end of the brake plate is fixed on the free end of a plate 58. The outer surface of the free end of the plate 58 is pressed lightly by the free end of an adjustment screw 61 which is screwed in an immovable member 59, while the lower portion of the plate 58 is loosely connected with the operation rod 122a of the solenoid 122 fixed on an immovable member. The solenoid 122 is designed so as to be actuated by the operation of the start button.

As mentioned previously, by the operation of the start button after the front edge of a sheet has been clamped, the solenoid 122 is actuated so as to pull the lower portion of the plate 58 as shown in FIG. 19. As a result, the brake shoe 56 is brought into pressure contact with the peripheral surface of the brake wheel 55 by the elasticity of the brake plate 57 so that the rotation speed of the main shaft 2 or the drum 1 is reduced. The design of this brake apparatus is such that the action of the brake apparatus is released by disconnecting an electric circuit to the solenoid 122 at the time when the drum 1 has made about one revolution and thereafter the drum 1 is rotated at a normal speed.

Figure 20:
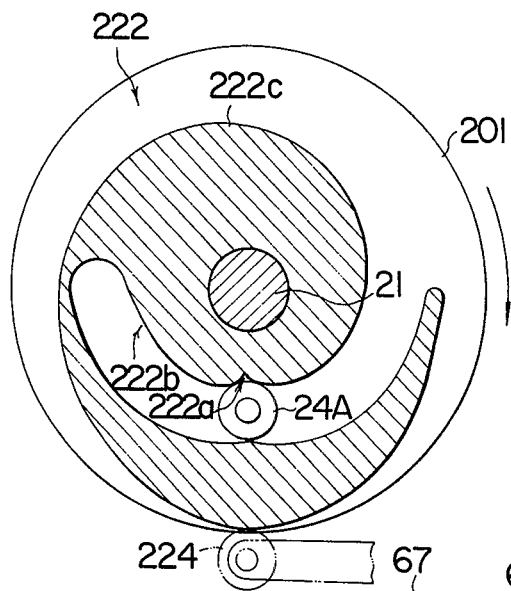
FIG. 20 illustrates another preferred embodiment of a brake means according to the invention.

FIG. 20 shows another preferred embodiment of a brake apparatus according to the present invention. In this figure, on the shaft of a rotating body 201, a peripheral cam 222 is fixed, which rotates together with the rotating body 201 in the direction of the arrow. In the small diameter portion of this rotating body, one extended surface 222b of the peripheral surface of the concave portion 222a of the heart cam 222 is closed as shown in FIG. 20 and, in the other extended surface 222c, the diameter of the cam gradually increases during about one revolution of the cam, and beyond about one revolution, the diameter of the cam decreases. The roller 224, pivotally mounted on the free end of the rotating member 223, is usually positioned apart from the heart cam 222. In order to stop the rotating body 201, which rotates in the direction of the arrow, the driving source of the rotating body 201 must be disconnected and at the same time the roller 224 must be brought into pressure contact with the heart cam 222. By the movement of the roller 224 from the small diameter portion of the heart cam 222 to the large diameter portion of the heart cam, a braking force is given to the rotating body 201 and, after an appropriate number of rotations, the heart cam 222 rotates reversely a little and the roller 224 is dropped into the concave portion 222a of the heart cam 222 whereby the rotating body 201 is stopped at a predetermined position.

When starting the rotation of the rotating body 201, the roller is gradually pushed outwards from the position shown by the solid line 24A whereby a braking force is given to the rotating body 201 during the first revolution, and thus the rotating body is rotated at a low speed. The design is such that the roller is kept in a position away from the peripheral surface of the drum by an appropriate means shown by a virtual line in accordance with the position of the large diameter position.

Figure 21:
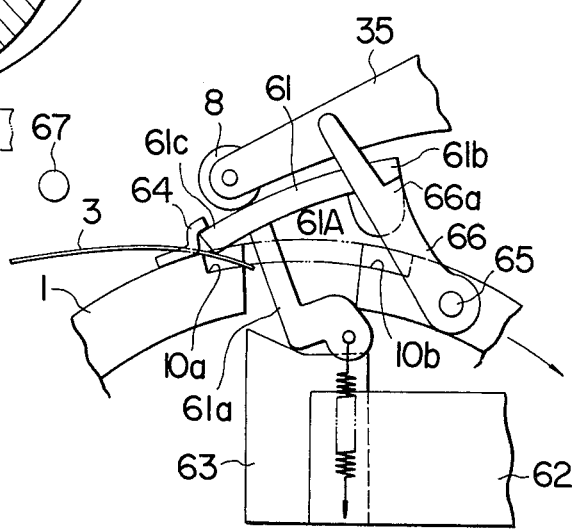
FIG. 21 and FIG. 22 illustrate another preferred embodiment of a sheet clamp apparatus according to the invention.
Figure 22:
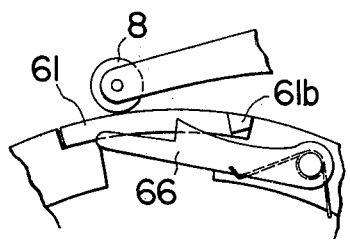

FIGS. 21 and 22 show another preferred embodiment of a sheet clamp apparatus according to the present invention. In FIG. 21, a clamp member 61 is usually retracted in the position shown by a virtual line 61A. A leg 61a of the clamp member 61 is lifted by a cam portion 63 provided at the free end of a follower member 62 which is moved in accordance with the opening and closing of the cover 5 in the above mentioned embodiment. The clamp member 61, one side edge of which is held by a pair of stoppers 64 provided at both ends of the drum 1, is rotated about the stoppers 64 as shown in FIG. 21. The projected portion 61b at the other end of the pressure member 61 remains to be stopped at the stepped portion 66a of a holding member 66 whose base is pivotally mounted on the drum 1 through a pivot 65. When the cover 5 is closed after insertion of a sheet 3 in this condition, the front edge of the sheet 3, pressed at the stop portion 10a, is clamped by one side edge portion 61c of the clamp member 61. When the drum 1 is rotated in the direction of the arrow in this condition, the rear end of the sheet 3 is inserted in the other opened side of the clamp member and then a free end of the holding member 66 strikes an immovable pin 67 so as to release the clamp member whereby the rear end of the sheet, pressed at the step portion 10b of the drum 1, is clamped. In the previously mentioned embodiment, since the recording stylus is positioned in close proximity to the peripheral surface of the drum, the opening of the clamp member for clamping the rear end of the sheet follows one revolution of the drum 1. However, if by use of the recording stylus (or read-out head) which is placed apart from the peripheral surface of the drum, or a plunger, the recording stylus is brought into close proximity to the peripheral surface of the drum only at the time of scanning, the drum can be rotated with the rear clamp of the clamp member 61 kept open as shown in FIG. 21, which permits simplification of the mechanism of the apparatus.

Figure 23:
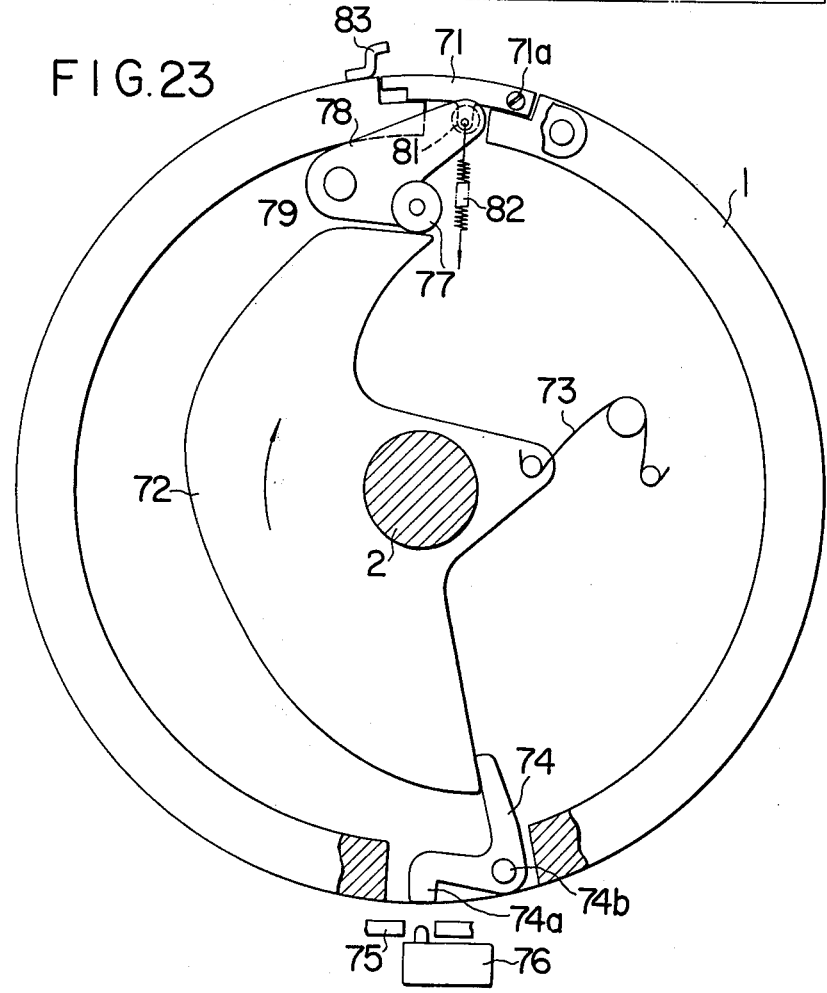
FIG. 23 and FIG. 24 illustrate a further embodiment of a sheet clamp apparatus according to the invention.
Figure 24:
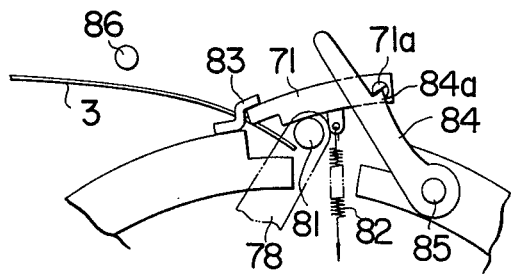

FIGS. 23 and 24 illustrate another preferred embodiment of a sheet clamp apparatus according to the present invention. The clamp member 71 is opened independently of the above mentioned cover 5. A cam 72 pivotally mounted on a main shaft 12 is integral with a rotating member (not shown) provided at one end of the drum 1. The cam 72 is rotated by rotating manually the rotating member. The cam 72 is given a counterclockwise rotating bias by a compression spring 73. When the cam 72 is rotated clockwise from the position shown in FIG. 23, a stopper 74, following the cam 72, is rotated counterclockwise. The stopper 74 is pivotally mounted on the drum 1 through a pivot 74b and is given a counterclockwise rotating bias by a spring (not shown). By the rotation of the stopper 74, a free end 74a of the stopper 74 is engaged in an opening formed in a side plate 75 and pushes a safety switch 76 whereby the drum 1 is stopped at a predetermined position and, even if the start switch is actuated by mistake, the drum 1 is not driven.

When the cam 72 is rotated in the direction of the arrow in FIG. 23, it pushes and moves a roller 77. A follower member 78 with the roller 77 mounted through a pivot is pivotally mounted on the drum 1 through a pivot 79. A pin 81 fixed on a free end of the follower member 78 pushes the lower surface of the clamp member 71 during the clockwise rotation of the follower member 78 as shown in FIG. 24. The clamp member 71 is pulled inwards by a spring 82, one end of which is fixed on the drum 1. The clamp member 71, with one side edge of the member being held by a stopper 83 provided at each end of the drum 1, is rotated about the stopper as shown in FIG. 24. This position of the clamp member 71 is maintained by stopping a pin 71a, which has a cutaway portion and is fixed on the clamp member, at a step portion 84a of the holding member 84. The holding member 84 is pivotally mounted at the drum 1 through a pivot 85. When the cam 72 is returned to its original position shown in FIG. 23 after the front edge of a sheet 3 has been inserted, the left side edge portion of the clamp member 71 is closed so that the front edge of the sheet is clamped. In this condition, when the drum 1 is rotated, the rear edge of the sheet is inserted in the inside of the other side edge portion of the clamp member 71 which is opened beforehand. Further, a free end of the holding member 84 strikes an immovable pin 86 and releases the clamp member 71 whereby the clamp member 71 is closed and the rear edge of the sheet 3 is clamped.

Thus, irrespective of the opening and closing operations of the previously mentioned cover, the opening and closing of the clamp member 71 can be preformed by the rotation of the cam 72. In other words, the front edge of the sheet can be clamped.

What is claimed is:

1. A sheet clamp apparatus comprising, in combination: a drum around which a sheet is to be wound, said drum having a recess, at one part of its peripheral surface, extending along a generating line of said peripheral surface; a single clamp member conformably engageable in said recess substantially flush with said peripheral surface and movable radially outwardly of said drum, said single clamp member having leading and trailing edges; means biasing said clamp member to seat in said recess; stopping means operable to stop said drum at a predetermined position so that single clamp member is always set at an identical initial position; means operable to move said single clamp member radially outwardly of said drum, with said drum stopped at said predetermined position, for introduction of the front edge of a sheet beneath the trailing edge of said single clamp member for clamping of the front edge of the sheet for wrapping of the sheet around said drum upon rotation of said drum; and means operable, immediately before said drum finishes one revolution following insertion of the front edge of the sheet beneath the trailing edge of said clamping member, the engage the rear edge of the sheet beneath the leading edge of said single clamping member for clamping of the sheet to the peripheral surface of said drum.

2. A sheet clamp apparatus, as in claim 1, in which said biasing means comprises spring means biasing said clamp member in the direction of the center of said drum to bring said leading and trailing edges of said clamp member into pressure contact with respective clamp member receiving edges on opposite sides of said recess; means operable to bring the trailing edge of said clamp member into pressure contact with the corresponding clamp member receiving edge after the front edge of the sheet has been clamped between the trailing edge of said clamp member and the corresponding clamp member receiving edge; stroking means operable to maintain the sheet in pressure contact with said drum and to stroke the sheet on said drum during about one revolution of said drum after the front edge of the sheet has been clamped; and means operable to bring the leading edge of said clamp member into pressure contact with the corresponding clamp member receiving edge after the rear edge of the sheet has been clamped.

3. A sheet clamp apparatus as in claim 2 wherein the clamp member comprises a long and narrow elastic thin plate.

4. A sheet clamp apparatus as in claim 2 wherein the means for detaching the clamp member from the clamp member receiving edges of the drum which is stopped at a predetermined position, includes a cover which is positioned above said drum and can be opened and closed selectively; and a member which operatively connects said cover with said clamp member, and by opening said cover, said clamp member is disengaged from said clamp member receiving edges.

5. A sheet clamp apparatus as in claim 2 wherein stopping means for stopping the drum is positioned at the end of said drum and comprises a heart cam, which rotates integrally with said drum, and a roller capable of being pressed against the peripheral surface of said heart cam.

6. A sheet clamp apparatus as in claim 2 wherein a friction means is provided which slides in pressure contact with a sheet wound round said drum at the time of sheet discharge so that the front edge of the sheet can be pulled out of said clamp member.

7. A sheet clamp apparatus, as in claim 2, including brake means comprising a brake wheel fixed on a shaft rotatable together with said drum; an elastic brake plate having a brake shoe fixed thereon, and which can be brought into pressure contact with part of the peripheral surface of said brake wheel; a solenoid operable to bring said brake shoe into such pressure contact; and means operable to actuate said brake means during winding of the sheet and during the first rotation of said drum, and thereafter to release said brake means so that said drum can be rotated at a normal speed.

8. A sheet clamp apparatus, as claimed in claim 2, including brake means comprising a peripheral cam fixed at one end of said drum and having a concave portion, such as in a heart cam, at a small diameter portion of said peripheral cam; one peripheral side of said peripheral cam being closed and the other extended peripheral side of said peripheral cam gradually opening during about one revolution of said drum; means mounting a roller spaced from said cam when said drum is stopped; and means operable to bring said roller into contact with said peripheral cam whereby said drum is braked and stopped at a predetermined position and, when said drum is started, said roller is brought into pressure contact with said peripheral cam during one revolution only and thereafter is retracted from said peripheral cam so that said drum cam be rotated at a slow speed during said first one revolution only.

9. A sheet clamp apparatus as in claim 2, including means operable to enhance the stroking effect of said stroking means; supporting members mounting said stroking means; said enhancing means pushing said supporting members toward the center of said drum by running on said supporting members when said stroking means comes near the trailing end of the sheet, immediately before said drum completes one rotation following clamping of the leading edge of the sheet.

10. A sheet clamp apparatus, as in claim 2, including a recording stylus; apparatus of retracting said recording stylus from the peripheral surface of said drum; said apparatus comprising a heart cam substantially integral with said drum; a roller; means operable to stop said drum at a predetermined position by bringing said roller into pressure contact with said heart cam; a supporting member supporting said recording stylus for disengagement of said recording sytlus from the peripheral surface of said drum; and a linkage mechanism operable to move said supporting member in a direction to retract said recording stylus from the peripheral surface of said drum.

* * * * *